United States Patent
Sudo et al.

(10) Patent No.: US 8,563,107 B2
(45) Date of Patent: Oct. 22, 2013

(54) CONTAINER FOR MEDICAL PRODUCTS

(75) Inventors: Nobuo Sudo, Tokyo (JP); Yasushi Kawachi, Tokyo (JP)

(73) Assignee: Daikyo Seiko, Ltd., Tokyo (JP)

( * ) Notice: Subject to any disclaimer, the term of this patent is extended or adjusted under 35 U.S.C. 154(b) by 13 days.

(21) Appl. No.: 13/143,699

(22) PCT Filed: Feb. 4, 2010

(86) PCT No.: PCT/JP2010/051569
§ 371 (c)(1),
(2), (4) Date: Jul. 7, 2011

(87) PCT Pub. No.: WO2010/090244
PCT Pub. Date: Aug. 12, 2010

(65) Prior Publication Data
US 2011/0284559 A1 Nov. 24, 2011

(30) Foreign Application Priority Data

Feb. 4, 2009 (JP) .................................. 2009-023578

(51) Int. Cl.
*B32B 1/02* (2006.01)
(52) U.S. Cl.
USPC ....................................................... 428/35.7
(58) Field of Classification Search
USPC ........................................ 428/35.7; 220/660
See application file for complete search history.

(56) References Cited

U.S. PATENT DOCUMENTS

| | | | |
|---|---|---|---|
| 5,462,995 A | 10/1995 | Hosaka et al. | |
| 5,723,189 A | 3/1998 | Sudo | |
| 6,171,670 B1 * | 1/2001 | Sudo et al. | 428/35.7 |
| 6,543,612 B2 * | 4/2003 | Lee et al. | 206/222 |
| 2007/0026173 A1 * | 2/2007 | Hussain et al. | 428/35.7 |

FOREIGN PATENT DOCUMENTS

| | | |
|---|---|---|
| JP | 4-8910 Y2 | 3/1992 |
| JP | 5-43663 A | 2/1993 |
| JP | 5-293159 A | 11/1993 |
| JP | 6-157672 A | 6/1994 |
| JP | 8-98870 A | 4/1996 |
| JP | 8-193149 A | 7/1996 |
| JP | 10-114374 A | 5/1998 |
| JP | 3198065 B2 | 8/2001 |

OTHER PUBLICATIONS

International Search Report for PCT/JP2010/051569 dated Mar. 2, 2010.

* cited by examiner

*Primary Examiner* — Erik Kashnikow
(74) *Attorney, Agent, or Firm* — Kenealy Vaidya LLP

(57) ABSTRACT

A sanitary container has a hollow cavity for storing a product in cleanliness. A wall portion of the container has a laminated structure of an inner layer and an outer layer. The outer layer is made of a cyclic olefin polymer containing at least one pigment selected from the group consisting of C.I. Pigment Yellow 147, C.I. Pigment Yellow 180 and C.I. Pigment Yellow 181 and added therein. The inner layer is made of a cyclic olefin polymer free of the at least one pigment. The sanitary container is superb in pigment dispersion (ultraviolet ray blocking property), is free of troublesome contamination of its content with pigment particles, and is also excellent in impact resistance strength, gas barrier properties and interface bonding.

3 Claims, No Drawings

CONTAINER FOR MEDICAL PRODUCTS

TECHNICAL FIELD

This application is a U.S. national phase filing under 35 U.S.C. §371 of PCT Application No. PCT/JP2010/051569, filed Feb. 4, 2010, which claims priority to Japanese Patent Application No. 2009-023578 filed on Feb. 4, 2009, the entire disclosures of which being incorporated herein, and to which all priority rights are hereby claimed.

This disclosed subject matter relates to a plastic-made sanitary container capable of stably storing a product that requires cleanliness or a like product—for example, a drug such as a vaccine, protein preparation, antibiotic, vitamin or amino acid, a nutrient solution, a transfusion solution, a cosmetic, a food such as a seasoning—over a long period of time while maintaining cleanliness.

BACKGROUND ART

Drugs, foods, cosmetics, and other products to be kept in cleanliness have conventionally been filled and stored in sanitary containers in many instances. Such sanitary containers must be able to protect their contents from intrusion of microorganisms and also to prevent their contents from a quality change, deterioration or the like by ultraviolet rays or the like.

The intrusion of microorganisms into a container is prevented by sealing the container or hermetically closing the container with a rubber plug or the like, whereas the quality change, deterioration or the like of a content by ultraviolet rays or the like is avoided by adding a deterioration preventive to the content or incorporating an ultraviolet absorber in a sanitary container itself. Glass-made containers have conventionally been used for many years as containers most suited from the viewpoint of sanitation for drugs, nutrient solutions, transfusion solutions, foods and the like.

Soda-lime glass as a raw material for glass-made container is high in gas permeation resistance and water vapor permeation resistance (gas barrier properties) and has heat resistance, and also has relatively high chemical durability. Moreover it is of low price. Accordingly, glass-made containers are often made of soda-lime glass (soft glass). However, these glass-made containers involve glass-associated problems in that they are fragile and cannot store drug solutions having reactivity with silicon and drug solutions having high alkalinity. To avoid these glass-associated problems, there is now an increasing tendency to adopt plastic-made containers in place of glass-made containers.

Plastics have advantages over glass in that the former are lower in fragility, lighter in weight, and superior in moldability or formability compared with the latter. On the other hand, plastics are accompanied by disadvantages such that depending on the kinds of the plastics, they have low heat resistance and/or can provide molded or otherwise formed products with insufficient strength and/or with inferior gas transmission permeation and/or water vapor permeation resistance (gas barrier properties). Moreover, plastics also involve a serious problem to be solved in connection with ultraviolet ray transmission resistance (ultraviolet ray blocking property). Therefore, no plastics have heretofore been found yet to be equipped in a well-balanced manner with properties required for sanitary containers.

Concerning the light-shielding property (ultraviolet ray transmission resistance) of a colored container, the "Testing Method for Glass Containers for Injectable Preparations" in Item 7.01 of The Pharmacopoeia of Japan (fifteenth edition) specifies that the transmission rate should be 50% or lower at wavelengths of from 290 to 450 nm and 60% or higher (45% or higher in the case of a container that cannot be sealed by fusion and has a wall thickness of 1.0 mm or greater) at wavelengths of from 590 to 610 nm. In the United States, on the other hand, it is also specified in USP 31 General Chapter <671>, Table 2 that the transmission rate of a plastic bottle at wavelengths of from 290 to 450 nm differs depending on its capacity and should be, for example, 10% or lower for 50 mL capacity and 25% or lower for 1 mL capacity.

Under the foregoing situation, cyclic olefin polymers are known to be suited as plastics for sanitary containers. However, such cyclic olefin polymers are also high in ultraviolet transmission property like the conventional plastics, and sanitary containers made of these cyclic olefin polymers have a potential problem that their contents may be changed or deteriorated in quality by such rays. To avoid such a potential problem, there have been proposed inventions on sanitary containers, which make use of specific organic pigments as ultraviolet absorbers (Patent Documents 1 and 2).

PRIOR ART DOCUMENTS

Patent Documents

Patent Document 1: JP-A-10-114374
Patent Document 2: JP-A-5-293159

DISCLOSURE

Examples of Problems to be Solved by the Disclosed Subject Matter

The above-described proposals are characterized in that the use of a homopolymer, which does not contain ethylene units or the like, as the cyclic olefin polymer results in higher impact resistance strength and higher chemical stability compared with the use of a copolymer, which contains ethylene units or the like, as the cyclic olefin polymer. The proposals, however, involve a potential problem in that the dispersibility of such a pigment in the resin is poor and any attempt to use the pigment in a greater amount with a view to obtaining sufficient ultraviolet ray blocking property may lead to an exposure of pigment particles at an inner wall of the resulting container and, when the content is liquid, pigment particles may get mixed in with the liquid content. There is another problem that the resin is inferior in gas barrier properties. On the other hand, the use of a copolymer, which contains ethylene units or the like as the cyclic olefin polymer results in good dispersibility of the pigment and lessens such a problem as described above compared with the use of a homopolymer, which does not contain ethylene units or the like, as the cyclic olefin polymer, but involves problems that the resulting container is provided with lower impact resistance strength and is fragile.

Patent Document 2 also discloses a sanitary container of a cyclic olefin polymer and a plastic of another type laminated with each other. The adoption of such a laminated structure, however, involves a problem in the bonding between plastic layers, and may develop various problems such as separation and clouding at the interface and occurrence of cracks or crazes.

As a result of enthusiastic research conducted to solve the above-described problems, the present inventor has found that a container—which is excellent in interface bonding, is superb in pigment dispersion (ultraviolet ray blocking property), is free of troublesome contamination of its content with pigment particles and is also excellent in impact resistance strength and gas barrier properties—can be obtained by forming a wall portion of the container in a laminated structure of cyclic olefin materials, dispersing a pigment in an outer layer only, providing an inner layer as a pigment-free layer, and using, as a polymer for the outer layer, a cyclic olefin copolymer having still better pigment dispersibility to ensure pigment dispersibility and using, as a resin for the inner layer, a cyclic olefin homopolymer having excellent chemical stability and impact resistance strength.

Exemplary Means for Solving the Problem

In one aspect of the presently disclosed subject matter, there is thus provided a sanitary container having a hollow cavity for storing a product in cleanliness, wherein a wall portion of the container has a laminated structure of an inner layer and an outer layer, the outer layer is made of a cyclic olefin polymer containing at least one pigment selected from the group consisting of C.I. Pigment Yellow 147, C.I. Pigment Yellow 180 and C.I. Pigment Yellow 181 and added therein, and the inner layer is made of a cyclic olefin polymer free of the at least one pigment.

In the presently disclosed subject matter as described above, the cyclic olefin polymer of the outer layer may be an ethylene-cyclic olefin copolymer, and the cyclic olefin polymer of the inner layer may be a cyclic olefin homopolymer; the pigment may have been added in an amount of from 0.01 to 0.3 wt % based on the corresponding polymer; and the outer layer may have a thickness of from 0.5 to 3 mm, and the inner layer may have a thickness of from 0.5 to 3 mm.

Examples of Advantageous Effects of the Disclosed Subject Matter

According to the presently disclosed subject matter, there is provided a container which is superb in pigment dispersion (ultraviolet ray blocking property), is free of troublesome contamination of its content with pigment particles, and is also excellent in impact resistance strength, gas barrier properties and interface bonding.

EXEMPLARY EMBODIMENTS OF THE DISCLOSED SUBJECT MATTER

The presently disclosed subject matter will next be described specifically based on embodiments of the disclosed embodiments.

The polymers for use in the production of the sanitary container in the presently disclosed subject matter can be either the same cyclic olefin polymer or different cyclic olefin polymers for the outer layer and inner layer. One can, however, use a cyclic olefin copolymer having excellent pigment dispersibility for the outer layer and a cyclic olefin homopolymer having excellent chemical stability for the inner layer. It is to be noted that the term "cyclic olefin polymer" as used herein encompasses the hydrogenation product of the polymer.

The cyclic olefin homopolymer or copolymer or the hydrogenation product thereof can be a ring-opened homopolymer of a cyclic olefin monomer or ring-opened copolymer of the cyclic olefin monomer with another monomer, or the hydrogenation product of the homopolymer or copolymer. Examples of the above-described cyclic olefin monomer include, as will be exemplified below, monocyclic olefin monomers, and polycyclic olefin monomers including bicyclic and higher cyclic olefin monomers.

Illustrative of the monocyclic olefin monomers usable for the production of the cyclic olefin homopolymer or copolymer are monocyclic olefin monomers such as cyclopentene, cyclopentadiene, cyclohexene, methylcyclohexane and cyclooctene; lower-alkyl derivatives thereof containing, as substituent groups, 1 to 3 lower alkyl groups such as methyl and/or ethyl groups: and acrylate derivatives thereof.

Illustrative of the polycyclic olefin monomers are dicyclopentadiene, 2,3-dihydrocyclopentadiene, bicycle[2,2,1]-hepto-2-ene and derivatives thereof, tricyclo[4,3,0,1$^{2,5}$]-3-decene and derivatives thereof, tetracyclo[4,4,0,1$^{2,5}$]-3-undecene and derivatives thereof, tetracyclo[4,4,0,1$^{2,5}$,1$^{7,10}$]-3-dodecene and derivatives thereof, pentacyclo[6,5,1,1$^{3,6}$, 0$^{2,7}$,0$^{9,13}$]-4-pentadecene and derivatives thereof, pentacyclo [7,4,0,1$^{2,5}$,0,0$^{8,13}$,1$^{9,12}$]-3-pentadecene and derivatives thereof, and hexacyclo[6,6,1,1$^{3,6}$,1$^{10,13}$, 0$^{2,7}$,0$^{9,14}$]-4-heptadecene and derivatives thereof.

Examples of the bicycle[2,2,1]-hepto-2-ene derivatives include 5-methyl-bicyclo[2,2,1]-hepto-2-ene, 5-methoxy-bicyclo[2,2,1]-hepto-2-ene, 5-ethylidene-bicyclo[2,2,1]-hepto-2-ene, 5-phenyl-bicyclo[2,2,1]-hepto-2-ene, and 6-methoxycarbonyl-bicyclo[2,2,1]-hepto-2-ene.

Examples of the tricyclo[4,3,0,1$^{2,5}$]-3-decene derivatives include 2-methyl-tricyclo[4,3,0,1$^{2,5}$]-3-decene and 5-methyl-tricyclo[4,3,0,1$^{2,5}$]-3-decene. Examples of the tetracyclo[4,4,0,1$^{2,5}$]-3-undecene derivatives include 10-methyl-tetracyclo[4,4,0,1$^{2,5}$]-3-undecene.

Examples of the tetracyclo[4,4,0,1$^{2,5}$,1$^{7,10}$]-3-dodecene derivatives include 8-ethylidene-tetracyclo[4,4,0,1$^{2,5}$,1$^{7,10}$]-3-dodecene, 8-methyl-tetracyclo[4,4,0,1$^{2,5}$,1$^{7,10}$]-3-dodecene, 9-methyl-8-methoxycarbonyl-tetracyclo[4,4,0, 1$^{2,5}$,1$^{7,10}$]-3-dodecene, and 5,10-dimethyl-tetracyclo[4,4,0, 1$^{2,5}$,1$^{7,10}$]-3-dodecene.

Examples of the hexacyclo[6,6,1,1$^{3,6}$,1$^{10,13}$, 0$^{2,7}$,0$^{9,14}$]-4-heptadecene derivatives include 12-methyl-hexacyclo[6,6,1, 1$^{3,6}$,1$^{10,13}$, 0$^{2,7}$,0$^{9,14}$]-4-heptadecene and 1,6-dimethyl-hexacyclo[6,6,1,1$^{3,6}$,1$^{10,13}$, 0$^{2,7}$,0$^{9,14}$]-4-heptadecene.

One example of the cyclic olefin polymer is a homopolymer of at least one cyclic olefin monomer or a copolymer of at least one cyclic olefin monomer with at least one of other monomers (for example, ethylene, propylene, 4-methylpentene-1, cyclopentene, cyclooctene, butadiene, isoprene, styrene, and the like). This homopolymer or copolymer can be obtained by polymerizing the above-described monomer or monomers, for example, while using as a catalyst a known catalyst which is soluble in a hydrocarbon solvent and is composed of a vanadium compound or the like and an organoaluminum compound or the like (JP-A-6-157672, JP-A-5-43663, etc.).

Another example of the cyclic olefin polymer is a ring-opened homopolymer of the above-described monomer or a ring-opened copolymer of the above-described monomers. It can be obtained by homopolymerizing the above-described monomer or copolymerizing the above-described monomers while using as a catalyst a known catalyst, for example, such as (1) a catalyst composed of a halide, the nitrate or the like of a platinum group metal such as ruthenium, rhodium, palladium, osmium or platinum and a reducing agent or (2) a catalyst composed of a compound of a transition metal such as titanium, molybdenum or tungsten and an organometal compound of a metal in one of Groups I to IV of the periodic table such as an organoaluminum compound, organotin compound or the like (JP-A-6-157672, JP-A-5-43663, etc.).

Where the homopolymer or copolymer obtained as described above contains unsaturated bonds, the homopolymer or copolymer is hydrogenated by using a known hydrogenation catalyst. Examples of the hydrogenation catalyst include (1) Ziegler-type homogeneous catalysts which are each composed of a salt of an organic acid with titanium, cobalt, nickel or the like and an organometal compound of lithium, aluminum or the like, (2) supported catalysts which are each composed of a carrier such as carbon or alumina and a platinum group metal such as palladium or ruthenium supported on the carrier, and (3) catalysts which are each composed of a complex of one of the above-described platinum group metal (JP-A-6-157672, etc.).

In the presently disclosed subject matter, examples of the above-described hydrogenated homopolymer or copolymer include ring-opened homopolymers or copolymers of polycyclic saturated hydrocarbon compounds containing two or more rings. These polycyclic saturated hydrocarbon compounds may have one or more substituent groups containing a polymerizable double bond.

Examples of such polycyclic saturated hydrocarbon compounds include tricyclo[4,3,0,1$^{2,5}$]-decane, bis(allyloxycarboxy)-tricyclo[4,3,0,1$^{2,5}$]-decane, bis(methacryloxy)-tricyclo[4,3,0,1$^{2,5}$]-decane, and bis(acryloxy)-tricyclo[4,3,0,1$^{2,5}$]-decane.

In the container according to the presently disclosed subject matter, its wall portion is formed in the laminated structure, the outer layer is made of a cyclic olefin polymer (an ethylene-cyclic olefin copolymer) with the below-mentioned pigment contained therein, and the inner layer is made of a cyclic olefin polymer (a cyclic olefin homopolymer excellent in chemical stability) which does not contain the below-mentioned pigment and is either the same as or different from the cyclic olefin polymer of the outer layer.

The above-described ethylene-cyclic olefin copolymer is available, for example, under a trade name such as "TOPAS®" (product of Topas Advanced Polymers EmbH or "APL®" (product of Mitsui Chemicals, Inc.) for use in the presently disclosed subject matter. On the other hand, the cyclic olefin homopolymer is available, for example, under a trade name such as "Crystal Zenith®" (product of Daikyo Seiko, Ltd. Or "ZEONEX®" (product of Zeon Corporation) for use in the presently disclosed subject matter.

The pigment, which is added to the above-descried outer layer to reduce the transmission of ultraviolet rays in the presently disclosed subject matter, is C.I. Pigment Yellow 147 [chemical name: 1,1'-[(6-phenyl-1,3,5-triazine-2,4-diyl)-diimino]bis-9,10-anthracenedione], C.I. Pigment Yellow 180 [chemical name: 2,2'-[1,2-ethanediylbis(oxy-2,1-phenyleneazo)]bis[N-(2,3-dihydro-2-oxo-1H-benzimidazol-5-yl)-3-oxobutanamide], C.I. Pigment Yellow 181 [chemical name: N-[4-(aminocarbonyl)phenyl]-4-[[1-[[(2,3-dihydro-2-oxo-1H-benzimidazol-5-yl)amino]carbonyl]-2-oxopropyl]azo] benzamide], or a mixture thereof. These pigments are represented by the below-described structural formulas, respectively. Needless to say, these pigments are all readily available on the market for use in the presently disclosed subject matter and have no problem in safety and sanitation.

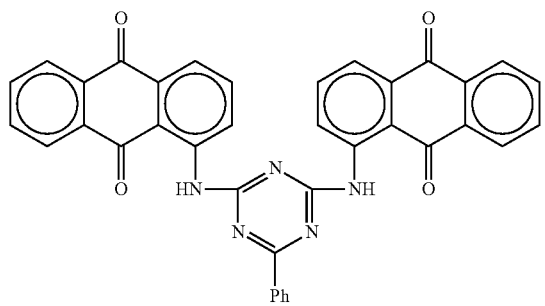

C.I. Pigment Yellow 147

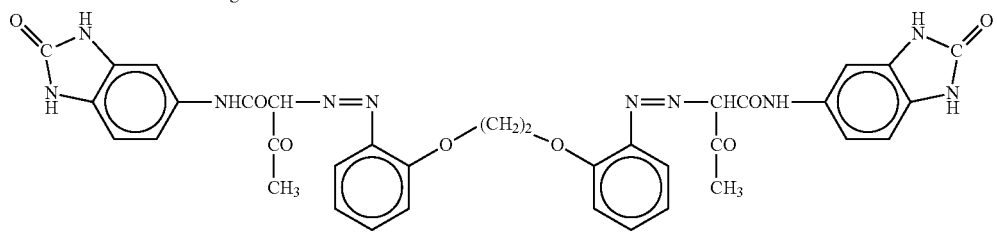

C.I. Pigment Yellow 180

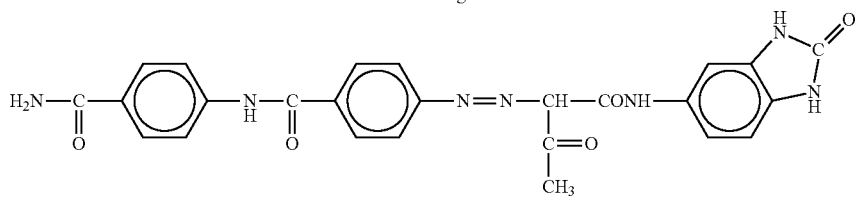

C.I. Pigment Yellow 181

No particular limitation is imposed on the amount of the pigment to be used. However, an unduly small amount cannot provide sufficient light shielding property (ultraviolet ray shielding property) while an unduly large amount makes the coloration deep and hence makes difficult the visual identifiability of the content of the container. An amount may range from 0.01 to 0.3 wt % based on the polymer. To facilitate dispersion of the pigment in the polymer upon molding the container, one can knead the pigment with a vehicle resin in advance so that the pigment can be used as a high-concentration master batch (pigment concentration: 10 to 60 wt %).

The container according to the presently disclosed subject matter can be produced by adding, in addition to the above-described pigment, a phenol-based, thioether-based, phosphorus-based or like age resister, an ultraviolet absorber, a processing aid such as a higher fatty acid or an ester thereof or a silicone oil, and other property-improving polymers or elastomers, as needed, to the resin for the outer layer; mixing and kneading the resultant mixture while using a conventional mixer such as a kneader, roll mixer or extruder to provide a compound (composition) for the outer layer; also providing a cyclic olefin homopolymer, which does not contain the above-described pigment and does not contain the above-described additives, for the inner layer; and using these compound (composition) and cyclic olefin homopolymer and molding them into a container of a predetermined shape by the double injection method or by a method that subjects a preform, which has been formed by the double injection method, to blow molding. It is to be noted that, although the container may also be produced by separately molding the inner layer and outer layer and then combining them together or by forming a preform from the combination and then subjecting the preform to blow molding, the use of the above-mentioned double injection method is advantageous for the interlayer bonding.

For example, the container according to the presently disclosed subject matter can be obtained by injection-molding the above-described pigment-free compound into a desired shape, and on an outer surface of the injection-molded product, then conducting injection molding (double injection) with the above-described pigment-containing compound. In the container obtained as described above, the thickness of the outer layer may be from 0.5 to 3 mm, and the thickness of the inner layer may be from 0.5 to 3 mm. It is to be noted that no limitation is imposed whatsoever on the shape or the like of the container.

Containers according to the presently disclosed subject matter can be used as containers of various shapes, for example, as containers for drugs, nutrient solutions and transfusion solutions, such as ampoules and vials; as containers for syringes such as syringes and cartridges; as containers for various cosmetics; and as containers for various foods such as oils and soy sauce, for example, bottles.

EXAMPLES

The presently disclosed subject matter will next be described specifically based on the following examples and comparative examples, in which the designations of "parts" and "%" are on a weight basis unless otherwise specifically indicated.

Examples 1 & 2

Examples in Each of which the Polymer of an Outer Layer and that of an Inner Layer are the Same A cyclic olefin polymer (trade name: "Crystal Zenith®", product of Daikyo Seiko Ltd.,) and a cyclic olefin copolymer (trade name: "TOPAS®", product of Topas Advanced Polymers GmbH,) were provided. To aliquots (100 parts) of each of the polymer and copolymer, C.I. Pigment Yellow 147 (trade name: "Filester Yellow RN", product of Ciba-Geigy Japan Limited) was added in amounts of 0.05%, 0.1% and 0.2%, respectively, by using a Brabender plastograph to prepare compounds. Further, the same homopolymer and copolymer as the above-described polymers were also provided with neither the pigment nor other additives. By double-injection molding that used those homopolymer and copolymer, inner layers free of the pigment (thickness: 2 mm) were first formed, and with the pigment-containing cyclic olefin polymers making use of the same cyclic olefin polymers as the inner layers, outer layers (thickness: 2 mm) were then formed to produce multilayer vials of 2 mL in capacity. Those vials became deeper in yellowish coloration with the amount of the pigment, but retained transparency. It is to be noted that the multilayer container the inner and outer walls of which were both formed of the cyclic olefin homopolymer will be designated as "Example 1" while the multilayer container the inner and outer walls of which were both formed of the ethylene-cyclic olefin copolymer will be designated as "Example 2".

Using the colored compounds and the cyclic olefin polymers in the same combinations as in Examples 1 and 2, laminated sheets of colored layers (2 mm) and non-colored layers (2 mm) were also formed by press forming at the same time. By a double-beam spectrophotometer ("Model 150-20", manufactured by Hitachi, Ltd.), each sheet was measured at wavelengths of from 290 to 450 nm and from 590 to 610 nm for light transmission rate (ultraviolet ray blocking property). The results are shown below in Table 1. When the amount of the pigment was the same, Example 2 was higher by from 2 to 5% or so in ultraviolet ray blocking rate in the wavelength range of from 290 to 450 nm than Example 1.

TABLE 1

| Amount of pigment (%) | Light transmission rate (%) | | | |
| --- | --- | --- | --- | --- |
| | Example 1 | | Example 2 | |
| | 290-450 nm | 590-610 nm | 290-450 nm | 590-610 nm |
| 0 | ≤90 | ≥90 | ≤90 | ≥90 |
| 0.05 | ≤35 | ≥85 | ≤30 | ≥85 |
| 0.1 | ≤15 | ≥75 | ≤14 | ≥75 |
| 0.2 | ≤10 | ≥45 | ≤8 | ≥45 |

Examples 3 & 4

Examples in Each of which the Polymer of an Outer Layer and that of an Inner Layer are Different A container and laminated sheet molded and formed as in Example 1 except for the use of the resin (copolymer) for the outer layer in Example 2 instead of the resin for the outer layer in Example 1 were provided as Example 3, and a container and laminated sheet molded and formed as in Example 2 except for the use of the resin (homopolymer) for the outer layer in Example 1 instead of the resin for the outer layer in Example 2 were provided as Example 4. A light transmission rate test was conducted on those laminated sheets. As a result of the light transmission rate test, Example 3 showed higher ultraviolet light blocking property by from 2 to 5% or so than Example 4. The ultraviolet shielding property was presumably produced as an effect of the outer layer that contained the pigment. As the actual results of the test, the result of Example 3 was substantially the same as that of Example 2, and the result of Example 4 was substantially the same as that of Example 1. From these results, it has been confirmed that no substantial decrease in light transmission rate by a bonding interface is recognized even when lamination is made with different resins (homopolymer and copolymer) insofar as they are both cyclic olefin polymers.

Examples 5 & 6

Vials were produced in the same manner as in Examples 3 and 4 except for the use of C.I. Pigment Yellow 180 instead of C.I. Pigment Yellow 147. Those vials became deeper in yellowish coloration with the amount of the pigment, but retained transparency. At the same time, sheets of the same thickness were also formed from the same compounds, respectively, by press forming. By the double-beam spectrophotometer ("Model 150-20", manufactured by Hitachi, Ltd.), each sheet was measured at the wavelengths of from 290 to 450 nm and from 590 to 610 nm for light transmission rate. The results were similar to those obtained in Examples 3 and 4.

Examples 7 & 8

Vials were produced in the same manner as in Examples 3 and 4 except for the use of C.I. Pigment Yellow 181 instead of C.I. Pigment Yellow 147. Those vials became deeper in yellowish coloration with the amount of the pigment, but retained transparency. At the same time, 2-mm thick sheets were also formed from the same compounds, respectively, by press forming. By the double-beam spectrophotometer ("Model 150-20", manufactured by Hitachi, Ltd.), each sheet was measured at the wavelengths of from 290 to 450 nm and from 590 to 610 nm for light transmission rate. The results were similar to those obtained in Examples 3 and 4.

Comparative Example 1

Vials were produced as in Example 3 except that the pigment was not used.

Comparative Example 2

Vials were produced as in Example 4 except that the pigment was not used.

Comparative Example 3

Vials were produced as in Example 3 except that the resins for the inner layers and those for the outer layers were used for outer layers and inner layers, respectively.

Comparative Example 4

Vials were produced in Example 4 except that like the above-described Comparative Example 3, the resins for the inner layers and those for the outer layers were reversed.
Tests The vials obtained above in Examples 1-8 and Comparative Examples 1-4 were subjected to the below-described tests after they had been thoroughly washed. It is to be noted that the tests were conducted on the vials which had the pigment concentration of 0.2%.

(1) Dissolution Test

A dissolution test was conducted following the "Testing Method for Plastic-made Containers" prescribed in the Pharmacopoeia of Japan, Fifteenth Edition.

(2) Quantity of Fine Particles

Each vial was filled with 20 mL of dust-free water. After the vial was shaken for 10 minutes on a shaking machine, the vial was left standstill for 1 hour, and fine particles in the water, said fine particles being of 2.5 µm and greater in particle size, were counted by a light-blocking, automatic fine particle counter (manufactured by HIAC Corp.).

(3) Adsorption Test of Drug Solution

"Contomin Injection" (trade name; product of Yoshitomi Pharmaceutical Industrial Co., Ltd.), which was sealed in ampoule and contained chlorpromazine hydrochloride at a concentration of 25 mg/5 mL, was added to physiological saline. The resulting solution was adjusted to pH 7.0 with a hydrogen ion concentration regulator (product of Wako Pure Chemical Industries, Ltd.) to provide 500 mL of a testing drug solution. Each vial was filled with that testing drug solution, sealed by a rubber plug which was covered with a fluorinated resin film, and was allowed to stand for 10 months at room temperature. The content of chlorpromazine hydrochloride in the vial was determined by measuring an absorption of the testing drug solution at a wavelength of 254 nm by a spectrophotometer ("Model UV2100", trade name; manufactured by Shimadzu Corp.). Assuming that the concentration of chlorpromazine hydrochloride immediately after the filling was 100%, an adsorbed quantity was expressed in terms of a degrease (%) in the concentration of chlorpromazine hydrochloride after allowed to stand for 10 months.

(4) Photo-Deterioration Test

In a similar manner as the preparation of the drug solution in the above-described adsorption test, a drug solution containing vitamin K1 and vitamin B2 was prepared. Each vial was filled with that drug solution, followed by the exposure to ultraviolet rays (principal wavelengths: 340 to 450 nm) for 36 hours under a sunshine weatherometer ("We-SUN-He"; manufactured by Suga Shikenki K.K.). After the exposure, an adsorbed quantity of the drug solution [as measured in the same manner as in the above-described adsorption test (3)] and photo-degradations of vitamin K1 and vitamin B2 were determined. During the test, each vial was kept plugged. The photo-degradations of vitamin K1 and vitamin B2 were determined by the following methods.

(a) Vitamin K1

The concentration of vitamin K1 still remaining the drug solution in each vial after the exposure was measured at the wavelength of 254 nm by a UV detector. Assuming that the concentration of vitamin K1 before the exposure was 100%, the concentration of vitamin K1 after the exposure was expressed in terms of percentage (%).

(b) Vitamin B2

The concentration of vitamin B2 still remaining in the drug solution in each vial after the exposure was measured at a wavelength of 445 nm by an automatic spectrophotometer ("Model EPS-3T"; manufactured by Hitachi, Ltd.). Assuming that the concentration of vitamin B2 before the exposure was 100%, the concentration of vitamin B2 after the exposure was expressed in terms of percentage (%). The results of the above tests are shown below in Table 2.

TABLE 2

|  |  | Examples | | | | | | | |
| --- | --- | --- | --- | --- | --- | --- | --- | --- | --- |
|  |  | 1 | 2 | 3 | 4 | 5 | 6 | 7 | 8 |
| The pharma-copoeia of Japan | pH | −0.08 | 0.18 | −0.06 | 0.15 | −0.07 | 0.18 | −0.06 | 0.17 |
|  | $KMnO_4$-reducing substances | 0.09 | 0.04 | 0.08 | 0.06 | 0.08 | 0.05 | 0.08 | 0.04 |
|  | Residue on evaporation | 0.2 | 0.02 | 0.2 | 0.2 | 0.2 | 0.2 | 0.2 | 0.2 |
|  | UV absorption spectrum | 0.002 | 0.004 | 0.002 | 0.004 | 0.002 | 0.003 | 0.002 | 0.004 |
| Quantity of fine particles |  | 0 | 0 | 0 | 0 | 0 | 0 | 0 | 0 |
| Adsorbed quantity of drug solution |  | 0.4 | 0.4 | 0.5 | 0.4 | 0.4 | 0.4 | 0.4 | 0.4 |
| Photo-deteriora-tion test | Adsorbed quantity of drug solution | 0.6 | 0.5 | 0.5 | 0.7 | 0.5 | 0.6 | 0.5 | 0.5 |
|  | Vitamin K1 | 78 | 83 | 86 | 74 | 84 | 72 | 83 | 75 |
|  | Vitamin B2 | 85 | 88 | 94 | 82 | 89 | 78 | 91 | 82 |

|  |  | Comparative Examples | | | |
| --- | --- | --- | --- | --- | --- |
|  |  | 1 | 2 | 3 | 4 |
| The pharma-copoeia of Japan | pH | −0.07 | 0.17 | 0.43 | 0.21 |
|  | $KMnO_4$-reducing substances | 0.08 | 0.04 | 0.07 | 0.1 |
|  | Residue on evaporation | 0.2 | 0.2 | 0.2 | 0.2 |
|  | UV absorption spectrum | 0.002 | 0.004 | 0.01 | 0.006 |
| Quantity of fine particles |  | 0 | 0 | 0 | 0 |
| Adsorbed quantity of drug solution |  | 0.4 | 0.4 | 0.5 | 0.4 |
| Photo-deteriora-tion test | Adsorbed quantity of drug solution | 10.4 | 11.3 | 1.6 | 1.6 |
|  | Vitamin K1 | 13 | 11 | 82 | 80 |
|  | Vitamin B2 | 27 | 27 | 89 | 87 |

It is evident from the above results that the container according to the presently disclosed subject matter can pass the dissolution test prescribed in the Pharmacopoeia of Japan and is excellent in ultraviolet ray blocking property.

INDUSTRIAL APPLICABILITY

According to the above-described presently disclosed subject matter, there is provided a container which is superb in pigment dispersion (ultraviolet ray blocking property), is free of troublesome contamination of its content with pigment particles, and is also excellent in impact resistance strength, gas barrier properties and interface bonding.

The invention claimed is:

1. A sanitary container, comprising a hollow cavity and a wall portion, the wall portion of the container having a laminated structure of an inner layer and an outer layer forming an interlayer bond therebetween, the outer layer made of a cyclic olefin polymer containing at least one pigment selected from the group consisting of C.I. Pigment Yellow 147, C.I. Pigment Yellow 180 and C.I. Pigment Yellow 181 and added therein, and the inner layer made of a cyclic olefin polymer free of the at least one pigment, wherein the cyclic olefin polymer of the outer layer is an ethylene-cyclic olefin copolymer, and the cyclic olefin polymer of the inner layer is a cyclic olefin homopolymer.

2. The sanitary container according to claim 1, wherein the pigment has been added in an amount of from 0.01 to 0.3 wt % based on the corresponding polymer.

3. The sanitary container according to claim 2, wherein the outer layer has a thickness of from 0.5 to 3 mm, and the inner layer has a thickness of from 0.5 to 3 mm.

* * * * *